United States Patent
Bassov et al.

(10) Patent No.: US 10,592,469 B1
(45) Date of Patent: Mar. 17, 2020

(54) CONVERTING FILES BETWEEN THINLY AND THICKLY PROVISIONED STATES

(71) Applicant: EMC IP Holding Company LLC, Hopkinton, MA (US)

(72) Inventors: Ivan Bassov, Brookline, MA (US); Walter C. Forrester, Berkeley Heights, NJ (US); Michal Marko, Fanwood, NJ (US); Ahsan Rashid, Edison, NJ (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 781 days.

(21) Appl. No.: 15/197,071

(22) Filed: Jun. 29, 2016

(51) Int. Cl.
*G06F 16/11* (2019.01)
*G06F 16/13* (2019.01)
*G06F 16/17* (2019.01)

(52) U.S. Cl.
CPC ............ *G06F 16/116* (2019.01); *G06F 16/13* (2019.01); *G06F 16/1727* (2019.01)

(58) Field of Classification Search
CPC ..... G06F 16/116; G06F 16/1727; G06F 16/13
USPC ........................................................ 707/756
See application file for complete search history.

(56) References Cited

U.S. PATENT DOCUMENTS

| | | | |
|---|---|---|---|
| 7,865,485 B2 * | 1/2011 | Mullick | G06F 16/1774 707/704 |
| 9,256,603 B1 * | 2/2016 | Bono | G06F 16/10 |
| 9,778,996 B1 | 10/2017 | Bono et al. | |
| 9,841,901 B1 * | 12/2017 | Armangau | G06F 16/1727 |
| 9,864,753 B1 * | 1/2018 | Armangau | G06F 16/1727 |
| 9,916,102 B1 * | 3/2018 | Bassov | G06F 3/065 |
| 9,922,039 B1 * | 3/2018 | Armangau | G06F 3/0611 |
| 9,940,332 B1 * | 4/2018 | Zhou | G06F 16/13 |
| 10,013,425 B1 * | 7/2018 | Bassov | G06F 16/1727 |
| 10,089,316 B1 * | 10/2018 | Haase | G06F 16/1727 |
| 2011/0191296 A1 * | 8/2011 | Wall | G06F 16/00 707/639 |
| 2013/0103920 A1 * | 4/2013 | Wei | G06F 12/0646 711/173 |
| 2014/0164323 A1 * | 6/2014 | Park | G06F 16/178 707/611 |
| 2014/0279966 A1 * | 9/2014 | Rajpal | G06F 3/0605 707/693 |
| 2015/0074064 A1 * | 3/2015 | Goldberg | G06F 16/1724 707/692 |
| 2017/0199674 A1 * | 7/2017 | Delgado | G06F 3/0608 |

OTHER PUBLICATIONS

"EMC CLARiiON Reserved LUN Pool Configuration Considerations; Best Practices Planning", Sep. 2010, 23 pages.

* cited by examiner

*Primary Examiner* — James Trujillo
*Assistant Examiner* — Jessica N Le
(74) *Attorney, Agent, or Firm* — BainwoodHuang

(57) ABSTRACT

A technique for managing storage space in a data storage system implements data objects in respective files. In response to an instruction to convert a set of such files from thin to thick or from thick to thin, the data storage system checks whether it has enough available storage space to accommodate the set of files if conversion were to proceed. If so, conversion is performed, and each of the set of files is converted from thin to thick or from thick to thin, in accordance with the instruction.

20 Claims, 7 Drawing Sheets

CONVERTING FILES BETWEEN THINLY AND THICKLY PROVISIONED STATES

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly store data objects, such as LUNs (Logical UNits), file systems, virtual machine disks, and/or other types of objects, which the data storage systems make accessible to hosts for reading and/or writing. Administrators may specify settings for data objects at their times of creation. Such settings may include, for example, whether a data object is thick or thin. As is known, a "thick" data object is one that has a maximum predetermined size that is fully space-guaranteed. For example, if an administrator creates a thick data object and specifies a 10 GB size, then a data storage system hosting that object reserves a full 10 GB of storage space, regardless of the amount of storage space that the object actually consumes. As is further known, a "thin" data object is one that is not fully space-guaranteed. Rather, reserved space for a thin data object grows in response to that object being written-to, e.g., on demand as additional storage space is needed.

SUMMARY

Prior approaches have enabled administrators to change the size of thick data objects after their initial creation, e.g., by extending those objects to become larger or by reorganizing and truncating them to become smaller. However, it appears that once an object is defined as thick, it has remained thick for its entire lifetime. Likewise, it appears that once an object is defined as thin, it has remained thin for its entire lifetime.

Sometimes, an administrator may wish to redeploy a thin object as a new thick object, or vice-versa. For example, a production data object may have many snaps (point-in-time versions), and the administrator may discover that one of those snaps is a better version of the data object than the current production object. The administrator may then seek to deploy the snap in place of the production object. However, if the production object is thick and the snap is thin (a common scenario), the snap will be unsuitable as the new production object, as it lacks the space guarantees that the production object requires. In such situations, the administrator may create a new thick object of the needed size, copy the contents of the snap to the new thick object, and deploy the new thick object as the production object. Unfortunately, these activities are resource-intensive, as they typically require many disk accesses and computing cycles. The administrator may also wish to reclaim storage space reserved by the original thick data object. However, doing so may require reorganizing data of that thick object before truncating it, which also consumes valuable resources. What is needed is a way to redeploy a thin data object as a thick data object, or vice-versa, without incurring a large cost in terms of resource consumption.

In contrast with the above-described prior approaches, an improved technique for managing storage space in a data storage system implements data objects in respective files. In response to an instruction to convert a set of such files from thin to thick or from thick to thin, the data storage system checks whether it has enough available storage space to accommodate the set of files if conversion were to proceed. If so, conversion is performed, and each of the set of files is converted from thin to thick or from thick to thin, in accordance with the instruction.

In some examples, conversion of a data object from thick to thin, or vice-versa, involves a conversion in place of the object's underlying file. Details of the conversion may be captured in the file's metadata, which influence how the file is treated within the data storage system. For example, the data storage system may read such metadata and direct activities accordingly, e.g., by fully reserving storage space for a newly thick file or by reserving storage space on-demand for a newly thin file.

Advantageously, the improved technique enables a previously thin data object to become fully space-guaranteed without requiring creation of a new object and associated copying of object data, thereby avoiding consumption of valuable system resources. Likewise, the improved technique allows thick objects to be redesignated as thin, which enables a data storage system to apply previously reserved but unused storage space for other purposes, again, without incurring a large penalty in terms of resource consumption.

Certain embodiments are directed to a method of managing storage space in a data storage system. The method includes receiving an instruction to convert a file from a first state to a second state, the first state being one of (i) a thickly-provisioned state, in which the file has a predetermined maximum size that is fully space-guaranteed, and (ii) a thinly-provisioned state, in which the file has no predetermined maximum size that is fully space-guaranteed, the second state being the other of (i) the thickly-provisioned state and (ii) the thinly-provisioned state. In response to receiving the instruction, the method further includes performing a storage-checking operation, the storage-checking operation configured (i) to produce a successful result when the data storage system has enough available storage space to accommodate the file, including any space guarantee for the file, if conversion were to proceed and (ii) to produce an unsuccessful result when the data storage system does not have enough available storage space to accommodate the file, including any space guarantees for the file, if conversion were to proceed. In response to the storage-checking operation producing the successful result, the method still further includes converting the file from the first state to the second state.

Other embodiments are directed to a data storage system constructed and arranged to perform a method of managing storage space in a data storage system, such as the method described above. Still other embodiments are directed to a computer program product. The computer program product stores instructions which, when executed on control circuitry of a data storage system, cause the data storage system to perform a method of managing storage space in a data storage system, such as the method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein and is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing storage space in a data storage system implements data objects in respective files and converts one or more data objects from thin to thick or from thick to thin by converting the respective files. In response to an instruction to convert a set of files from thin to thick or from thick to thin, the data storage system checks whether it has enough available storage space to accommodate the set of files if conversion were to proceed. If so, conversion is performed, and each of the set of files is converted from thin to thick or from thick to thin, in accordance with the instruction.

This specification is provided in the following sections to assist the reader:

Section I is directed to an example environment and data storage system in which a file system includes multiple version families; and Section II is directed to particular improvements, which may be carried out in the example environment of Section I, for converting data objects from thin to thick or from thick to thin.

Section I: Example Environment:

As is known, some data storage systems employ a liability/insurance model to track available storage space. For example, when a file system built upon a pool of storage resources initiates an action that would change the amount of storage space required from the pool, the file system calculates a "liability." The liability identifies an estimate of the amount of storage space required from the pool to complete the action. If the storage pool has enough available storage space to cover the liability, then the pool may issue "insurance" against the liability, e.g., by increasing the amount of reserved space in the pool by the specified amount of liability. The file system may then proceed to perform the initiated action, as the storage space required to complete the action has been fully insured.

As described in this section, a novel technique for managing storage space in a data storage system generates liability values on a per-family basis, with each "family" including files in the file system that are related to one another by snapping. Each family thus groups together files in the file system that potentially share at least some blocks among one another based on snapshot activities. Distinct files that do not share blocks based on snapping are provided in separate families. The file system thus leverages the snap-based relationships among family members to produce more accurate estimates of liability than would otherwise be feasible.

Figure 1:
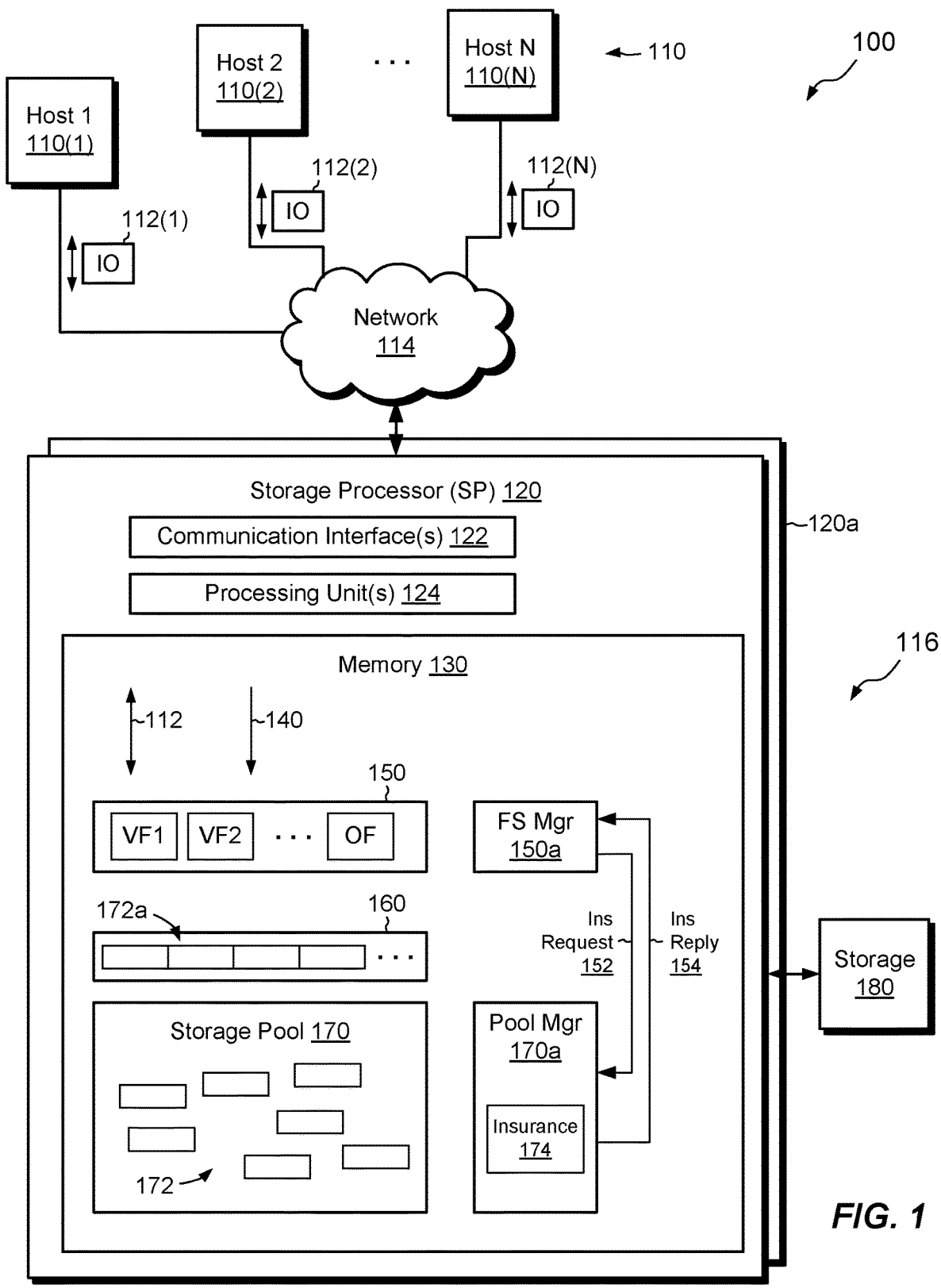
FIG. 1 is a block diagram of an example environment in which embodiments of the improved technique hereof can be practiced.

FIG. 1 shows an example environment 100 in which embodiments of the improved technique hereof can be practiced. Here, multiple host computing devices 110 ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. No particular hardware configuration is required, however, as any number of SPs, including a single SP, may be provided and the SP 120 can be any type of computing device capable of processing host IOs.

In an example, the storage 180 includes multiple disk drives, such as magnetic disk drives, electronic flash drives, solid state drives, optical drives, and/or other types of drives. Such disk drives may be arranged in RAID (Redundant Array of Independent/Inexpensive Disks) groups, for example, or any other suitable fashion.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 "includes," i.e., realizes by execution of software instructions, a file system 150, a file system manager 150a, a sparse volume 160, a storage pool 170, and a pool manager 170a. The file system manager 150a manages operations of the file system 150 and the pool manager 170a manages operations of the storage pool 170a. Although a single file system 150 is shown, the data storage system 116 may include multiple file systems all sharing the same storage pool 170. Also, the data storage system 116 may include multiple storage pools, with each pool supporting its own respective file systems. The example shown is simplified and intended to be merely illustrative.

The storage pool 170 consumes the storage 180 (e.g., disk drives, solid state drives, etc.) and renders portions thereof in the form of extents 172. In a non-limiting example, extents 172 are fixed-size increments of storage, such as 256 MB or 1 GB in size, which provide storage units that may be provisioned within the data storage system 116.

The pool manager 170a manages the provisioning of extents 172 from the pool 170 and performs accounting to manage insurance 174. For example, pool manager 170a maintains a balance of reservations on storage extents 172 needed to cover all liability of any and all consumers of the storage pool 170, to ensure that space guarantees are maintained. In an example, the pool manager 170a requires total insurance 174 always to meet or exceed total liability.

The file system 150 is built upon the sparse volume 160. In an example, each file system in the data storage system 116 has its own respective sparse volume. Provisioned extents 172a have been provisioned from the storage pool 170 to satisfy storage requirements of file system 150. As the file system 150 grows and requires additional storage space, the file system 150 requests one or more additional extents 172 from the storage pool 170. Not all data objects in the file system 150 are necessarily fully space-guaranteed. Thus, there may be times when the file system 150 requests extents 172 for non-guaranteed objects but none are available without violating existing space guarantees.

As further shown in FIG. 1, the file system 150 includes multiple version families, VF1, VF2, etc., as well as an overhead family, OF. Each version family includes one or more files, which, where multiple files are provided, relate to one another by snapping. In some examples, one file in a version family may be a production file and the other files in that version family may be snaps (point-in-time versions) of that production file. In other examples, a version family may include multiple production files that each may have initially been snaps of some original file, which may or may not still be present. As the files in each version family are related by snapping, each of the files in a version family generally has block-sharing relationships with each of the other files in that version family. For example, each file in a version family typically shares at least one block (and often many blocks) with each of the other files in that version family. Version families generally do not share blocks with one another, however. Thus, a file in one version family has no block-sharing relationship with a file in any another version family.

In an example, the files within each version family provide file-based realizations of host-accessible data objects, such as LUNs, files systems, VVols, and/or other types of virtual machine disks, for example. Mapping (not shown) within the memory 130 translates the data in these files to corresponding data objects, which are then made accessible to hosts 110.

As is known, 'snapping' is a process whereby a file system creates a point-in-time version (snap) of a file by allocating a new inode (file-specific metadata structure) for the snap and copying attributes from the file's inode to the snap's inode. The copied attributes include one or more pointers to an indirect block tree of the file, which points to and arranges data blocks that store file data of the file. Creating a snap therefore allocates new metadata (the new inode) but no new data blocks. Rather, all data blocks of the file are initially shared with the snap. Over time, as the file evolves, write splits occur in which new data blocks are allocated to the file at written-to locations. The file's indirect block tree is updated to point to the newly-allocated blocks, with new indirect blocks allocated as needed. However, the snap's data blocks and indirect block tree remain unchanged. A consequence of a write split is that a data block of the file, which was previously shared with a snap, becomes "unique" (unshared). The block may become shared again later when another snap is taken, but such sharing will be between the file and the new snap, not with the previous snap.

Unlike the version families (e.g., VF1, VF2, etc.), the overhead family, OF, typically does not include files or snaps but rather metadata structures that are common to many or all version families. These may include, for example, inodes, per-block metadata, virtual block maps, metadata of the sparse volume 160, and/or other structures. The file system 150 may store many of these structures per metadata block, such that any one block may include metadata that applies to multiple version families. In alternative embodiments, metadata applying to different version families may be stored in respective sets of blocks, such that these sets of blocks may be included in the version families rather than in a separate overhead family.

In example operation, hosts 110(1-N) issue IO requests 112(1-N) to the data storage system 116. The SP 120 receives the IO requests 112(1-N) at the communication interfaces 122 and initiates further processing. Such processing may include, for example, performing reads and writes to files in version families of the file system 150.

At some point, the file system 150 receives a command 140 to perform an action that would affect storage requirements of one or more files in a version family. In various examples, the action specified by the command 140 may be to create or delete a data object in a version family, to create or delete a snap, or to convert a file in a version family from thin to thick, or vice versa. In some examples, the command 140 originates from outside the data storage system 116, e.g., from a host 110 or an administrative computer (not shown). In other examples, the command 140 originates from within the data storage system 116, e.g., from another software construct running on the SP 120, or even from within the file system manager 150a itself, e.g., in response to the file system 150 requiring one or more additional storage extents 172 or being able to return one or more provisioned storage extents 172a to the storage pool 170.

As is known, a "thick" file is a file that has a predetermined maximum size that is fully reserved. For example, the pool manager 170a may provide 10 GB of insurance 174 to support a 10 GB thick file, even if the file only uses a fraction of that space. In contrast, a "thin" file is not fully reserved. Rather, reserved space for a thin file grows in response to the file being written-to, e.g., on demand in response to IO requests 112 from hosts 110. In an example, the file system 150 includes metadata that identifies a file as being either thin or thick, e.g., using an attribute of an inode of the file. Based on the setting of that attribute, the file system manager 150a treats the file accordingly, e.g., by fully reserving space to accommodate a maximum predetermined size of the file if the file is designated as thick, and by not fully reserving such space if the file is designated as thin.

In response to receiving the command 140 that would affect storage requirements of a version family, the file system 150 generates a family liability value. The family liability value provides an estimate of storage space that would be required for that version family if the action were performed. For example, if the action specified by command 140 is to create a new thick object, the new object would require additional liability at least as large as the maximum predetermined size of that thick object.

In some examples, generating family liability involves determining space requirements for both file data and certain metadata (e.g., indirect blocks) specific to the version family. In further examples, overhead liability is also determined at this time, to account for metadata not specific to the particular version family but necessary to fully support the specified action.

Once family liability is generated (e.g., for data, for metadata, for both, and/or for the overhead family), the file system manager 150a sends an insurance request 152 to the pool manager 170a specifying the generated liability value or values. The pool manager 170a then checks for available space in the storage pool 170, accounting for existing reservations indicated by insurance 174. The pool manager 170a then issues an insurance reply 154. If the pool 170 has available storage space greater than or equal to the requested liability value(s), the insurance reply 154 grants the insurance request 152. The action specified by command 140 may then proceed. However, if the pool 170 does not have enough available storage to meet the request 152, the insurance request 152 is denied and the action specified by the command 140 does not proceed.

Data storage system 116 may generate new family liability values in response to newly arriving commands and may provide different family liability values for different families. Liability values are thus generated on a per-family basis. As will be described, generating liability in this way leverages relationships among family members and avoids greatly overestimating liability requirements in the file system 150.

Figure 2:
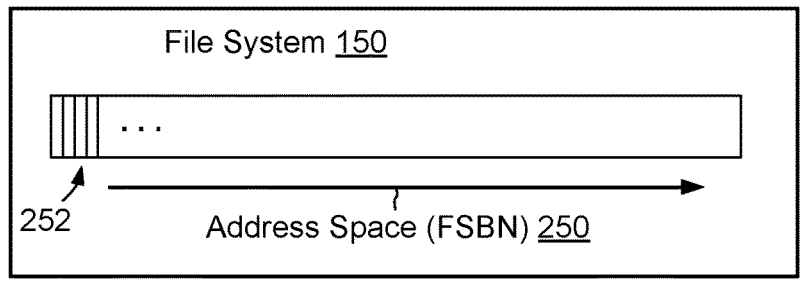
FIG. 2 is a block diagram of an example file system of FIG. 1.

FIG. 2 shows an example arrangement of file system 150 in additional detail. Here, it is seen that file system 150 has an address space 250, which ranges, for example, from zero to a large number. Each address in the address space 250 has an FSBN (File System Block Number) that uniquely identifies a respective block (see blocks 252). Some blocks 252 store file data while others store metadata. Some blocks 252 are shared among multiple files, whereas others are unique to a single file. Still other blocks 252 may be free, i.e., present within the address space 250 but not yet allocated to anything. Metadata stored in blocks within the file system address space 250 provides structure that defines files and version families in the file system 150.

Figure 3:
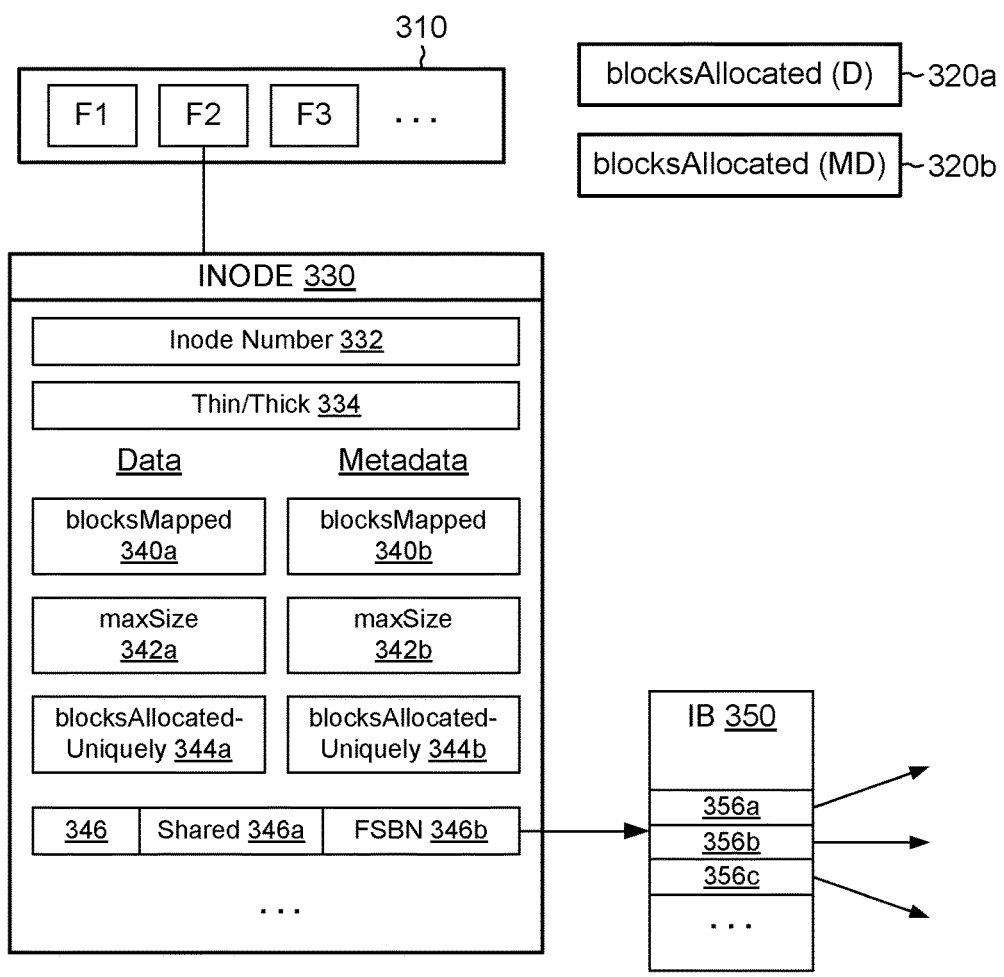
FIG. 3 is a block diagram of an example version family of FIG. 1, including example metadata structures.

FIG. 3 shows example metadata structures of file system 150. In an example, such metadata structures track information relevant to generating accurate family liability estimates.

As shown in FIG. 3, version family 310 includes multiple files, F1, F2, F3, and so on. Each file has an associated inode (index node), with inode 330 of file F2 shown in detail. Although the inode 330 relates particularly to file F2, it is intended to be representative of inodes of files in any version family.

Inode 330 stores attributes specific to the file F2, only some of which are shown. For example, inode number 332 uniquely identifies file F2 within the file system 150. Also, thin/thick attribute 334 specifies whether the file F2 is thin or thick. Some inode attributes are provided for both data and metadata (e.g., indirect blocks) of file F2, as described in the following table:

TABLE 1

| Term | Meaning for Data | Meaning for Metadata |
|---|---|---|
| blocksMapped | 340a: Number of data blocks mapped by the file; excludes holes; relevant for thin files; maintained in write IO path; incremented for each write to a hole. | 340b: Number of indirect blocks allocated to support the file; maintained in write IO path; incremented for each indirect block mapped. |
| maxSize | 342a: Predetermined maximum file size in blocks; relevant for thick files; established at file creation. | 342b: Number of indirect blocks needed to support thick file at its maxSize (342a); calculated at file creation. |
| blocksAllocated-Uniquely | 344a: Lower bound on number of data blocks that are unique to this file; maintained in write IO path; incremented when writing to shared block or hole. | 344b: Lower bound on number of indirect blocks unique to file; maintained in write IO path; incremented when writing to shared indirect block or hole. |

The file system manager 150a increments the attributes 344a and 344b for blocksAllocatedUniquely each time a write is performed to a shared block or a hole in the file. For example, writing to a hole (i.e., a previously unmapped location) causes a new block to be allocated, which therefore is initially unique. Also, writing to a shared block induces a write split, which causes a new block to be allocated. The new block is unique and thus is counted by blocksAllocatedUniquely. In an example, however, it is assumed that the write split in response to writing the source file does not cause the block to become unique in the shared file (the file with which the block was shared), as it is likely that the shared block was also shared with multiple other files, such that the write split would not cause the block to become unique in the other files.

The inode 330 further includes one or more block pointers, which point either to data blocks or to indirect blocks in the file system address space 250. For example, block pointer 346 points to an IB (Indirect Block) 350. Each block pointer includes a shared attribute 346a, which indicates whether the block pointed-to by the block pointer 346 is shared or not, and an FSBN 346b of the pointed-to block. Here, FSBN 346b is the address of indirect block 350. A block pointer indicate a "hole" if its FSBN 346b is blank, null, or otherwise invalid.

IB 350 includes an array of block pointers (e.g., 356a, 356b, 356c, etc.), which may each be arranged identically to block pointer 346, for example. Each block pointer in the IB 350 may itself point to another IB or to a data block. IB's may thus be arranged in an IB tree 360, with leaf IBs of the IB tree 360 pointing to data blocks.

As further shown in FIG. 3, file system 150 includes version-family metadata for version family 310. Such version-family metadata includes blocksAllocated 320a for data (D) and blocksAllocated 320b for metadata (MD). The blocksAllocated 320a for data maintains a count of all data blocks allocated to all files in the version family 310. Likewise, the blocksAllocated 320b for metadata maintains a count of all indirect blocks (IB's) allocated to support all files in the version family 310. In an example, the metadata structures 320a and 320b are updated in an IO write path, with writes induced by IO requests 112 (FIG. 1) monitored to count each data block and indirect block allocated to the version family 310.

Figure 4:
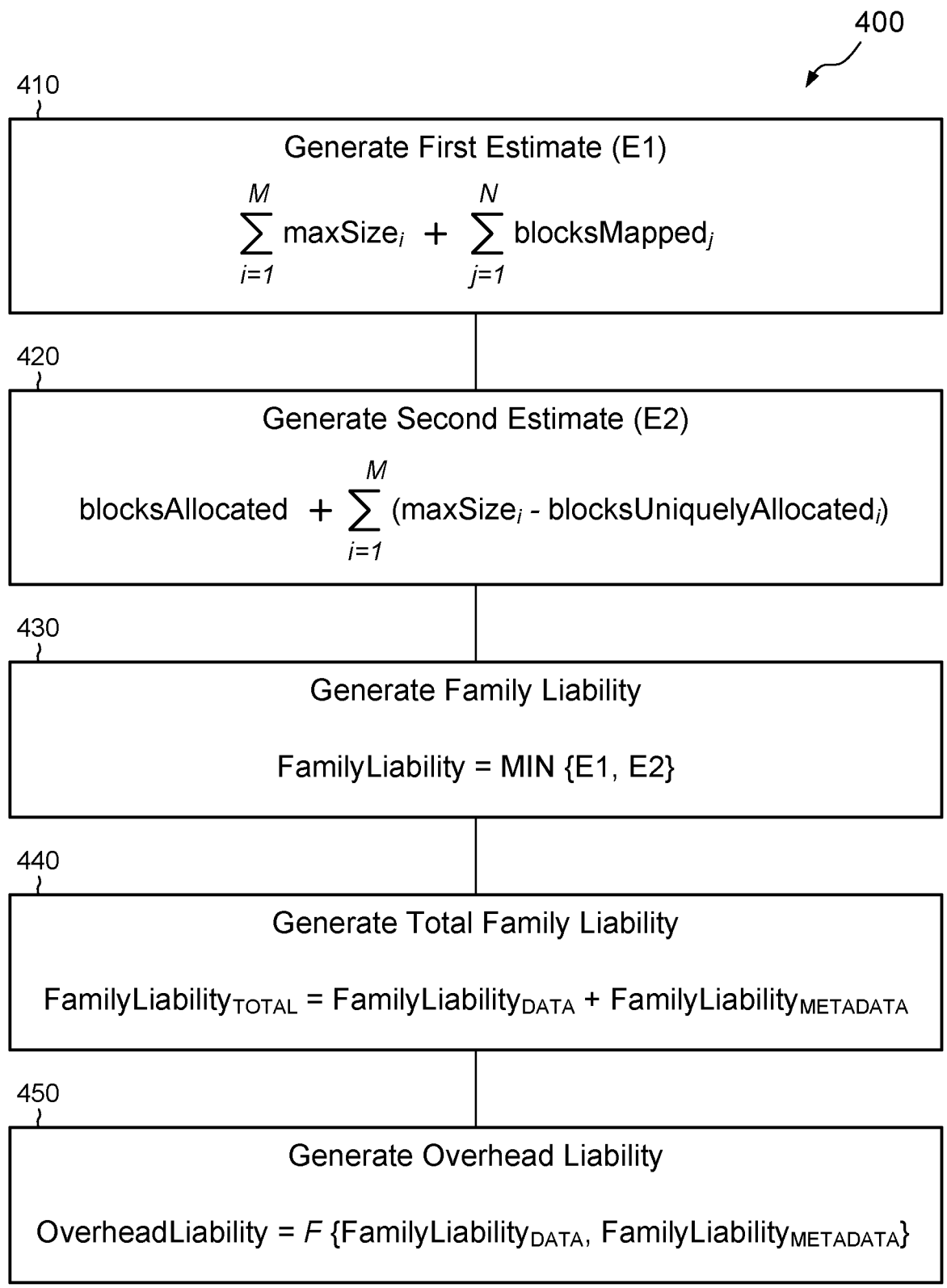
FIG. 4 is a flowchart showing an example method for generating liability.

FIG. 4 shows an example method 400 for generating liability values in file system 150. The method 400 may typically be carried out by the file system manager 150a, which runs in the memory 130 of SP 120.

Acts 410 and 420 generate first and second estimates (E1 and E2) for family liability, i.e., liability of a single version family. These acts may be performed in any order, or simultaneously.

Generating the estimate E1 at 410 involves producing a summation of maxSize (Table 1) over all thick files (1 to M) in the version family. Act 410 also involves producing a summation of blocksMapped (Table 1) over all thin files (1 to N) in the version family. The first estimate E1 is then provided as the sum of these summations. It can be seen from act 410 that the estimate E1 generates liability to fully reserve all thick files as well as all blocks mapped in all thin files. Estimate E1 may be an overestimate, however, as it fails to account for any blocks that may be shared. It should be appreciated that values for maxSize and blocksMapped may be obtained from the inodes of the files in question (see FIG. 3).

Generating the second estimate E2 at 420 involves adding the total blocks allocated in the version family, blocksAllocated, to a summation, over all thick files (1 to M) of the difference between the maximum predetermined size, maxSize, of each thick file and the number of blocksAllocatedUniquely in that thick file. The summation in 420 thus corresponds to the total number of shared blocks and holes in all thick files in the version family. Adding this summation to blocksAllocated yields estimate E2, which is often less than estimate E1, although not necessarily in all cases. It should be noted that maxSize and blocksAllocatedUniquely may be obtained from the inodes of the files in question, whereas blockAllocated may be obtained from version family metadata 320a and/or 320b. With estimates E1 and E2 established, act 430 generates family liability as the minimum of E1 and E2.

In an example, the acts 410, 420, and 430 are performed once for file data and again for file metadata (e.g., indirect blocks). For example, the file system manager 150a may generate family liability for data using values of blocksAllocated (D) 320a, blocksMapped 340a, maxSize 342a, and blocksAllocatedUniquely 344a. Likewise, the file system manager 150a may generate family liability for metadata using values of blocksAllocated (MD) 320b, blocksMapped 340b, maxSize 342b, and blocksAllocatedUniquely 344b.

In some examples, as shown in act 440, total family liability is generated as the sum of family liability for data and family liability for metadata. In other examples, family liability for data and metadata are kept separate.

At 450, the file system generates overhead liability for overhead family OF. In an example, the file system manager 150a calculates overhead liability as a function of family liability for data and family liability for metadata.

With liability values for data, metadata, and overhead thus established, the file system manager 150a may provide their sum in a single insurance request 152, for which a single insurance reply 154 is received (FIG. 1). Alternatively, the file system manager 150a may provide separate insurance requests, one for data, one for metadata, and one for overhead, and receive respective insurance replies, or may provide insurance requests in any combination.

It should be appreciated that counting all shared blocks in all thick files, as is done by the summation for estimate E2, can help to reduce overestimates of liability, as it accounts for the fact that thick files may share blocks with one another and/or with thin files. Estimate E2 thus leverages block-sharing relationships among files within a version family, in a way that could not be achieved readily without arranging files in version families, as block-sharing relationships among files would be much more difficult to account for when estimating liability.

It should further be appreciated that estimate E2 reserves space for existing thin files (e.g., snaps) by counting all blocksAllocated in the version family. Thus, not only does estimate E2 insure that all thick files (any number of them) are fully reserved, but also that all snaps (and other thin files) are reserved, at least to the extent of their current sizes. With this arrangement, it should never be necessary to invalidate snaps to meet space guarantees of thick files, as the estimate E2 results in enough insurance to support the existing thin files.

Estimate E1 also avoids the need to invalidate snaps, as it counts all mapped blocks in thin files as well as the maximum sizes of all thick files. Thus, estimate E1 counts all blocks allocated to snaps, whether the snaps are thin or thick.

It may be noted that the mere act of creating a snap of a file will generally result in an increase in estimate E2. Taking a snap will cause all blocks in the file from which the snap is taken to become shared, thus reducing blocksAllocatedUniquely for that file to zero and increasing the overall estimate. In an example, liability is generated upon each lifecycle event of an object or snap, such that reserved space is kept current with version families as they evolve.

Section II: Converting Data Objects from Thin to Thick, and Vice-Versa:

Techniques will now be described for converting data objects from thin to thick and from thick to thin. In an example, these techniques are performed by the data storage system 116 as described in connection with Section I. Details of the environment may vary, however, and the environment as described in Section I is intended to be illustrative rather than limiting.

Returning briefly to FIG. 1, we consider an example in which the instruction 140 specifies a conversion of a file from thin to thick. In the manner described above, the file may implement a host-accessible data object, such as a LUN, file system, VVol, etc., with the data storage system 116 providing mapping between the data object and the corresponding file. In an example, the instruction 140 identifies the file (e.g., by name or inode number), specifies the conversion from thin-to-thick, and indicates a predetermined maximum size of the file. In some examples, the instruction 140 may specify the data object, rather than the file, per se, with the data storage system 116 internally associating the data object with the corresponding file. In some examples, the instruction 140 identifies multiple files (or corresponding data objects), and specifies a maximum size for each.

Returning now to FIG. 3, it is assumed for this example that the instruction 140 specifies conversion of file F2 from thin to thick. As shown in FIG. 3, file F2 resides in file system 150 and has an associated inode 330 and an associated IB tree 360. As F2 is initially thin, the thin/thick attribute 334 is initially set to "thin," or its equivalent binary value.

File F2 is part of version family 310, which also includes other files (e.g., F1, F3, etc.). In a non-limiting example, file F2 implements a VVol and is a snap of F1, which implements a thick production object. The instruction 140, to convert F2 from thin to thick, may therefore reflect a desire to use the VVol implemented in the snap F2 as a new production object, instead of the one implemented in F1.

Figure 5:
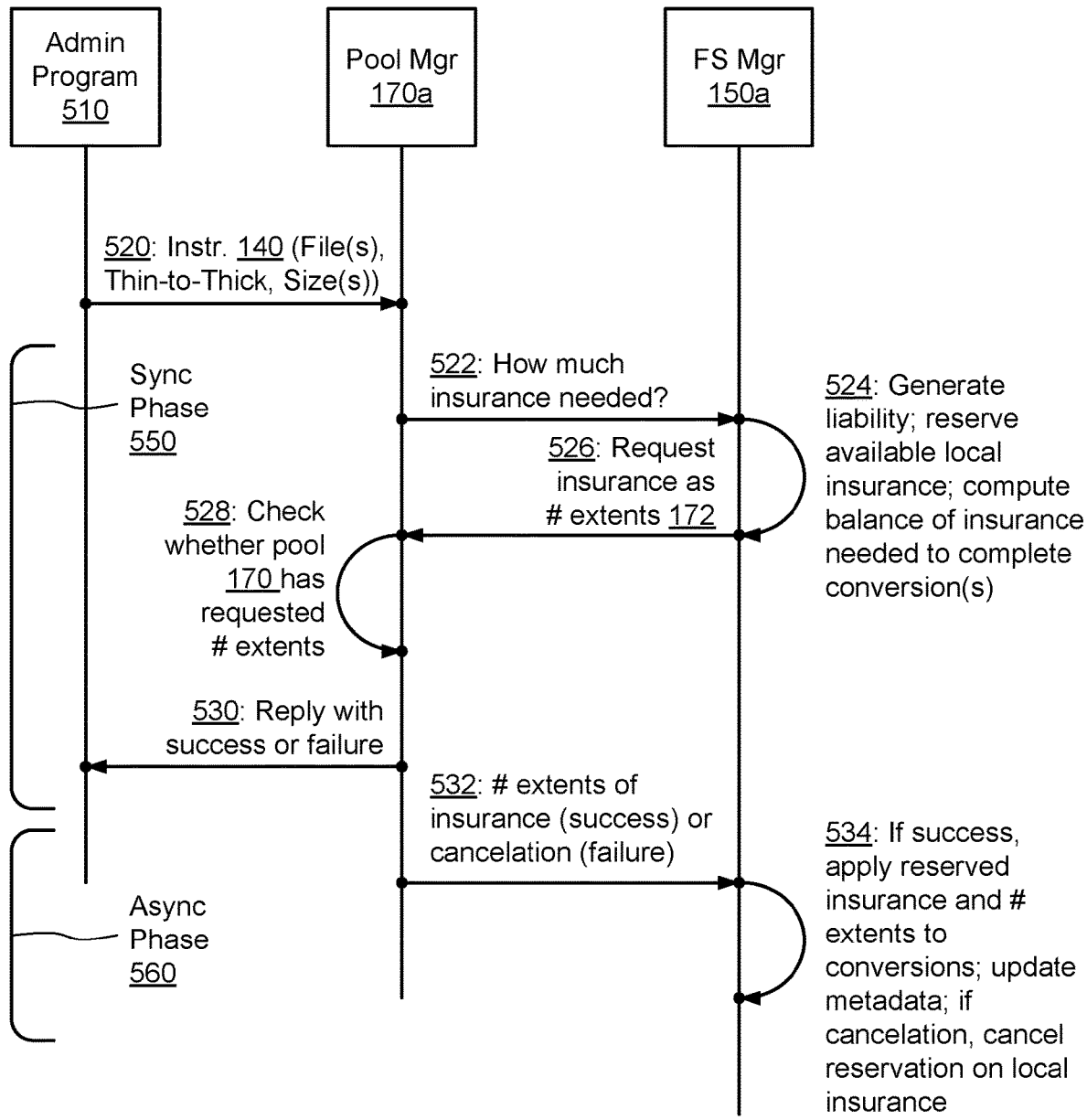
FIG. 5 is a sequence diagram showing an example method of converting a data object from thin to thick.

FIG. 5 shows an example sequence of activities for converting one or more files from thin to thick. The sequence is seen to involve administrative program 510, the pool manager 170a (FIG. 1), and the file system manager 150a (FIG. 1). The administrative program 510 may run within the data storage system 116, e.g., as a program running in the memory 130 of SP 120, elsewhere in the data storage system 116, or outside the data storage system 116, e.g., on a separate administrative computer.

As shown by arrow 520, the administrative program 510 sends instruction 140 to the pool manager 170a. The instruction 140 identifies the file or files to be converted and specifies the conversion from thin to thick. In some examples, the instruction 140 also provides a maximum size (or sizes) of the resulting thick objects, e.g., if the maximum sizes are to be different from the sizes of the thin objects. For this example, it is assumed that all files specified in the instruction 140 reside within the file system 150.

At 522, the pool manager 170a sends a request to the file system manager 150a asking how much insurance would be needed from the pool 170 (FIG. 1) to perform the conversion(s).

At 524, in response to receiving the request, the file system manager 150a generates a set of liability values, e.g., using the methods described in connection with FIG. 4. For example, the file system manager 150a generates a family data liability value for each version family that contains any of the files identified in the request 140. The file system manager 150a may also generate a family metadata liability value for each version family that contains any of the files identified in the request 140. It may further generate an overhead liability value for an overhead family. These liability values may be aggregated (summed) or managed separately. If handled separately, it should be appreciated that there will be family data and metadata liability values for each version family affected by the instruction 140. As will be described in further detail below, the file system manager 150a may already hold some amount of insurance, which it may have previously acquired from the pool 170. Some of this insurance may be uncommitted and therefore available for use in converting the file(s). The file system manager 150a identifies such available insurance and reserves it for the specified conversion(s). The reserved insurance is thus made unavailable to any other file system activities that may require additional insurance (e.g., snap creation, object creation, certain allocating writes, etc.). The file system manager 150a then identifies an amount of additional insurance needed to complete the conversion(s). For example, the file system manager 150a calculates the amount of additional insurance by subtracting the amount of reserved insurance from the liability (e.g., the total liability) needed to complete the conversion(s). In an example, the file system manager 150a expresses this amount of insurance in units of extents 172, with any fractional number of extents rounded up to the next integer number of extents. Also, in some examples, separate insurance amounts may be specified for family data, family metadata, and overhead liability.

At 526, the file system manager 150a replies to the request issued at 522 by identifying the number of extents 172 of insurance needed. In some examples, multiple replies are sent (e.g., for family data, family metadata, and overhead liability).

At 528, the pool manager 170a checks whether the pool 170 has the requested number (or numbers) of storage extents available, i.e., not currently in use or already reserved. A result of this operation is either "success" or "failure." Success means that the pool 170 has enough available space to provide the additional insurance, whereas failure means that the pool 170 does not have enough available space.

At 530, the pool manager 170a notifies the administrative program 510 of the success or failure.

At 532, the pool manager 170a again contacts the file system manager 150a. If the result was success, the pool manager 170a provides the insurance for the requested number of extents. If the result was failure, the pool manager 170a provides a cancelation.

At 534, assuming success, the file system manager 150a applies the received extents of insurance from the pool 170 along with the insurance that it reserved locally (at 524) to complete the pending conversion(s). Conversion of the identified file(s) may then proceed. Conversion activities may include, for example, accessing the inode (e.g., inode 330) of each file and setting the thin/thick attribute 334 to "thick," or the equivalent binary value. If the maximum size of any file will change, conversion activities may also include setting the maxSize attribute 342a of each such file to the respective new maximum size as specified in the instruction 140. Conversion may further include calculating the maximum number of indirect blocks required to fully map each file at the respective new maximum size and setting the maxSize attribute 342b to the calculated value. If failure occurred, however, the file system manager 150a may simply cancel the reservations on the local insurance, so that it is made available to other file system activities that might require insurance.

It should be appreciated that the sequence shown in FIG. 5 may be regarded as including a synchronous phase 550 and an asynchronous phase 560. The synchronous phase 550 generally happens quickly and provides the administrative program 510 with a fast response to the instruction 140, i.e., that the requested conversion(s) either succeeded or failed. This phase 550 primarily involves accounting for insurance using memory-resident structures and generally does not involve any persistent metadata changes in the file system 150. By contrast, the asynchronous phase 560 involves changes in persistent file system metadata, as attributes in the inode of each affected file are updated.

Further, it should be appreciated that reserving insurance locally at 524 promotes efficiency in communications within the data storage system 116. For example, in the absence of local insurance reservations, other activities performed by the file system manager 150a might use the insurance that the conversion requires, such that, by the time the number of extents arrive from the pool 170 (at 532), the amount of additional insurance requested is no longer enough. The local insurance reservations therefore prevent the file system manager 150a from having to ask for insurance multiple times to perform the same conversion(s).

When performing conversions on multiple files in file system 150, it may be possible to coalesce insurance, such that the total amount of insurance required to effect the conversions of files as a group is less than the amount of insurance that would be needed if conversions were conducted one at a time. For example, conversion of ten files as a group might result in an overhead family insurance request of one extent 172. However, if conversion were performed instead on each of the ten files individually, each file might require an additional extent 172 of overhead family insurance, causing the total overhead insurance to be ten times would it would be if the files had instead been converted together as a group.

Figure 6:
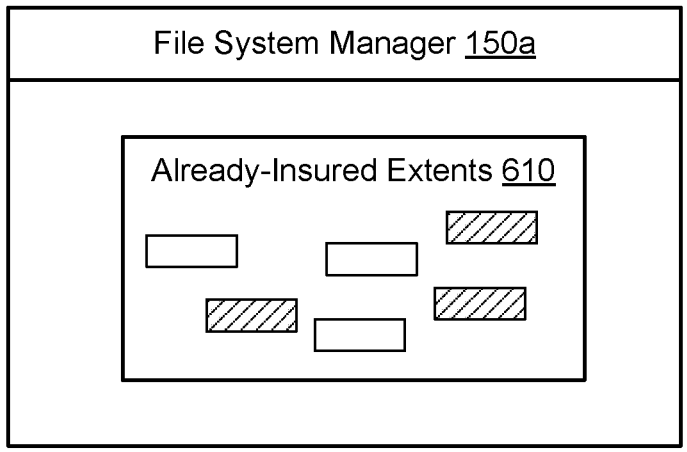
FIG. 6 is a block diagram showing example insured storage extents prior to a file system manager receiving a request to convert a set of files from thin to thick.

FIG. 6 shows an example arrangement of insurance held by the file system manager 150a. Here, it is seen that the file system manager 150a holds multiple already-insured extents 610. These extents 610 were originally provided as extents 172 of insurance from the pool 170. Some of the extents 610 are in use (diagonal hatching) whereas others are available (no hatching). Those that are available represent extra insurance, which the pool has allocated to the file system 150, but which are not currently being relied upon.

Figure 7:
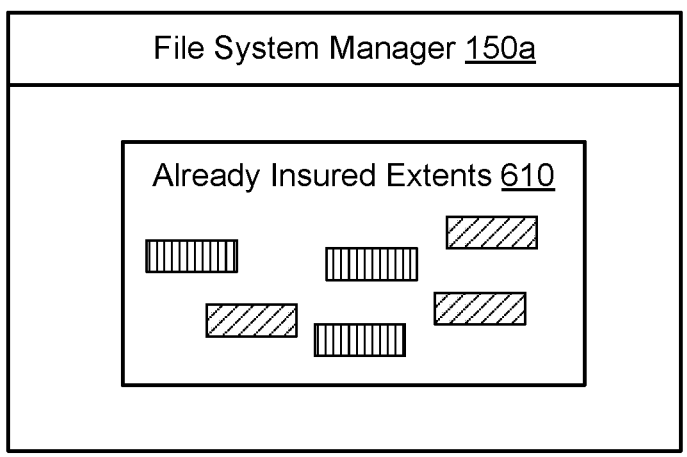
FIG. 7 is a block diagram showing the example insured storage extents of FIG. 6 after receiving the request to convert the set of files from thin to thick and after reserving storage extents for such conversion.

FIG. 7 shows the same arrangement after act 524 (FIG. 5) is performed. Here, the file system manager 150a has generated a set of liability values and has reserved available local insurance. In particular, the extents of free insurance from FIG. 6 have all now been reserved (vertical hatching). Reserving local extents 610 reduces the number of extents 172 of insurance required from the pool 170. Once additional insurance arrives from the pool 170, such insurance will be added to the already-insured extents 610 and used for the conversion(s).

Figure 8:
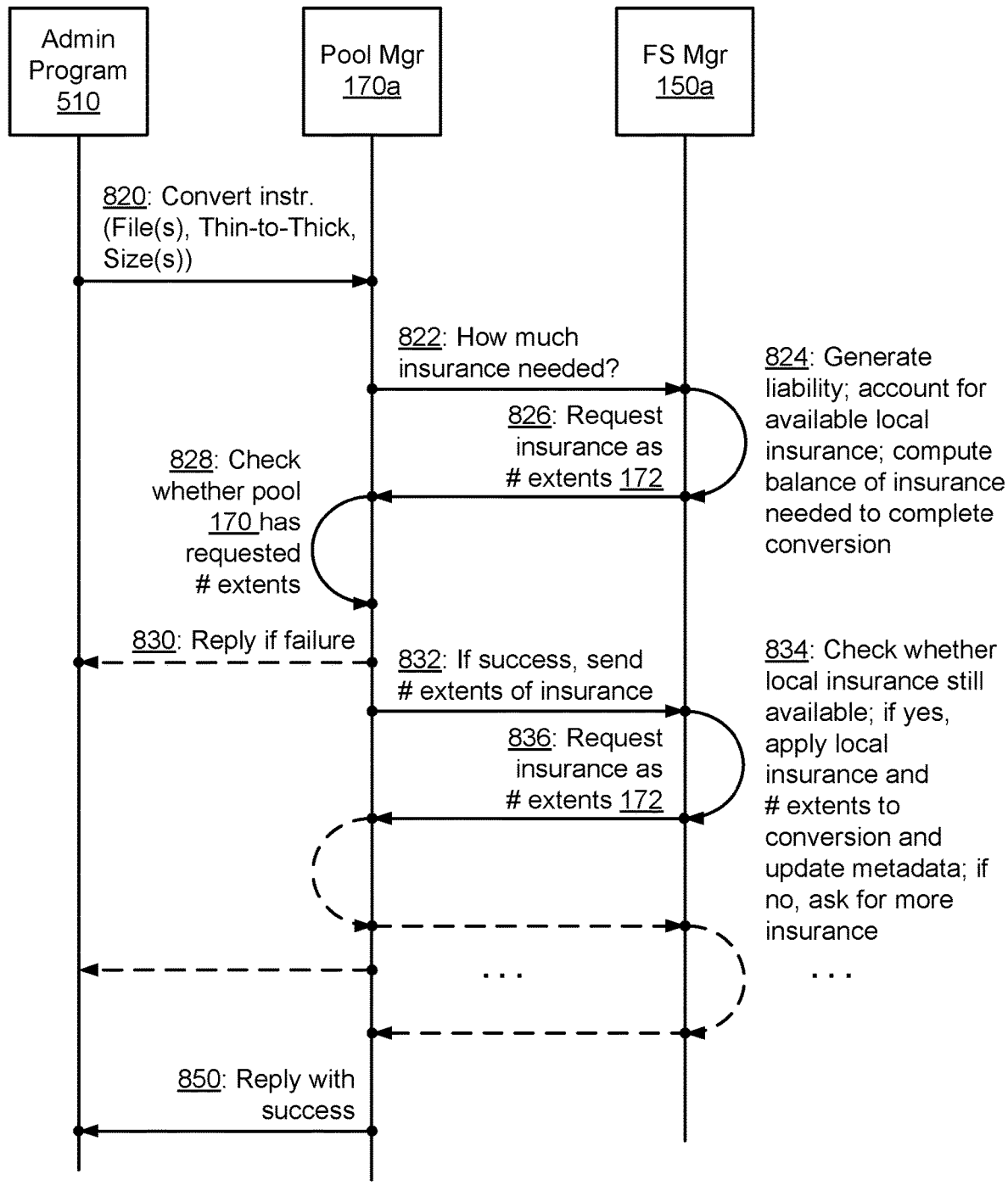
FIG. 8 is a sequence diagram showing another example method of converting a data object from thin to thick.

FIG. 8 shows an alternative sequence for converting one or more files from thin to thick. As with the sequence shown in FIG. 5, the sequence of FIG. 8 involves activities performed by and among an administrative program 510, the pool manager 170a (FIG. 1), and the file system manager 150a (FIG. 1). The sequence of FIG. 8 begins in a manner similar to that shown in FIG. 5.

As shown by arrow 820, the administrative program 510 sends instruction 140 to the pool manager 170a. The instruction 140 identifies the file or files to be converted, specifies the conversion from thin to thick, and, when the size of any object is changing, provides the new maximum size (or sizes) of the resulting thick objects. For this example, it is assumed that all files specified in the instruction 140 reside within the file system 150.

At 822, the pool manager 170a sends a request to the file system manager 150a asking how much insurance would be needed from the pool 170 (FIG. 1) to perform the conversion(s).

At 824, in response to receiving the request, the file system manager 150a generates a set of liability values, e.g., in the same way as described in connection with act 524 of FIG. 5. Here, however, no reservation is taken on local insurance. Rather, the file system manager 150a merely calculates the amount of additional insurance needed by subtracting the amount of local insurance from the liability (e.g., the total liability).

At 826, the file system manager 150a replies to the request issued at 822 by identifying the number of extents 172 of insurance needed. In some examples, multiple replies are sent (e.g., for family data, family metadata, and overhead liability).

At 828, the pool manager 170a checks whether the pool 170 has the requested number (or numbers) of storage extents available, i.e., not currently in use or already reserved. A result of this operation is either "success" or "failure." Success means that the pool 170 has enough available space on hand to provide the additional insurance, whereas failure means that the pool 170 does not have enough available space.

If the result is failure, then, at 830, the pool manager 170a notifies the administrative program 510, and the operation has failed. If the result is success, however, then no notification is sent, as it is not yet known whether the conversions can be completed successfully.

Rather, at 832, if the result of checking at 828 is success, then pool manager 170a sends the requested number of extents 172 of insurance to the file system manager 150a.

At 834, the file system manager 150a checks whether it still has all the local insurance needed to complete the conversions. If yes, the file system manager 150a applies the local insurance, which is unreserved but still available, along with the received insurance from the pool 170, and performs the conversion(s), e.g., by updating file system metadata, as described in connection with act 534 above. If no, e.g., because the local insurance has been taken by some other activity, the file system manager 150a may keep the insurance it received from the pool 170 but ask for more, as the amount that it has is not sufficient to complete the conversions.

At 836, the file system manager 150a notifies the pool manager 170a of additional extents of insurance needed, if any. If the number is zero, then operation proceeds to 850, where the pool manager 170a notifies the administrative program 510 that the requested conversions are complete (success). However, if the number of extents needed is a positive number, then the activities described in acts 828, 830, 832, 834, and 836 are repeated, as many times as needed, until the file system manager 150a obtains the number of extents of insurance that it needs to complete the conversions, or until the pool 170 responds that no more space is available.

Unlike the sequence described in FIG. 5, which involves a synchronous phase 550 and an asynchronous phase 560, the sequence of FIG. 8 does not make this distinction. The arrangement of FIG. 8 is thus simpler it implement than that of FIG. 5. However, unlike the arrangement of FIG. 5, the one of FIG. 8 is not guaranteed to complete with a single request for insurance from the pool 170 and thus may be less efficient. It may also delay responses to the administrative program 510.

Although the examples provided above describe conversion of one or more files from thin to thick, files may also be converted from thick to thin. Such conversions may involve the same sequences as described in FIGS. 5 and 8. However, additional numbers of extents required from the pool 170 (e.g., in acts 526 and 826) are expected to be zero or negative. Thus, conversion from thick to thin may result in insurance being given back to the pool 170, rather than being withdrawn. As for the files themselves, the thin/thick attributes 334 of previously-thick files will be changed to "thin." Attributes for blocksMappedUniquely will preferably continue to be tracked, even though they are not relevant for thin files, just in case the files are ever converted back to thick. In a like manner, blocksMapped attributes 340a and 340b, which are relevant only for thin files, are preferably tracked for both thin files and thick files, to readily support conversions between thick and thin.

Figure 9:
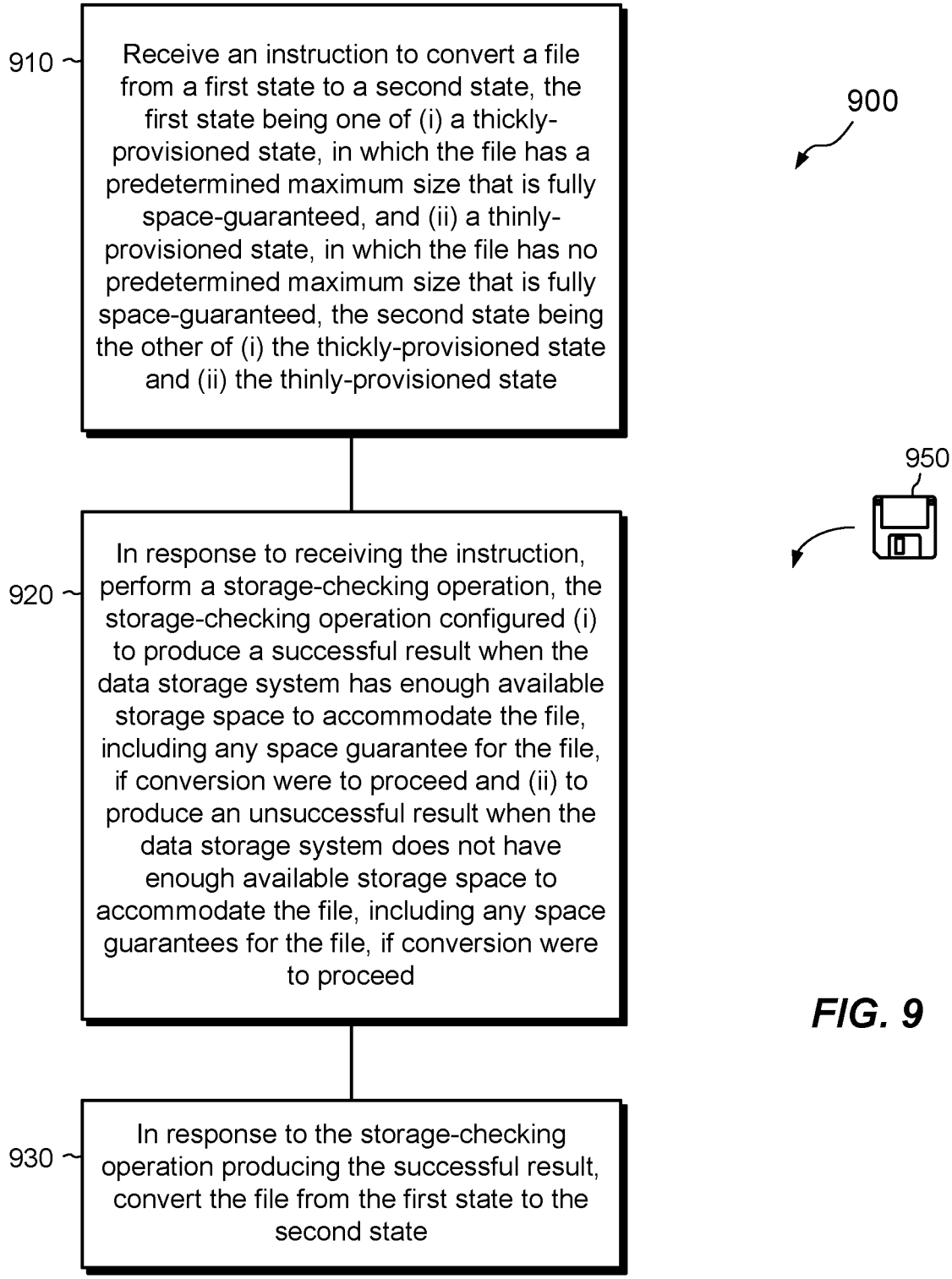
FIG. 9 is a flowchart showing an example method of managing space in a data storage system.

FIG. 9 shows an example method 900 for managing storage space in a data storage system. The method 900 may be carried out, for example, by the software constructs described in connection with FIGS. 1, 5, and 8. The various acts of the method 900 may be ordered in any suitable way.

At 910, an instruction 140 is received to convert a file (e.g., F2 of FIG. 3) from a first state to a second state, the first state being one of (i) a thickly-provisioned state, in which the file has a predetermined maximum size that is fully space-guaranteed, and (ii) a thinly-provisioned state in which the file has no predetermined maximum size that is fully space-guaranteed, the second state being the other of (i) the thickly-provisioned state and (ii) the thinly-provisioned state. Thus, for example, if the first state is thick, the second state is thin. Conversely, if the first state is thin, the second state is thick.

At 920, in response to receiving the instruction 140, a storage-checking operation is performed (e.g., acts 522-532 or 822-832). The storage-checking operation is configured (i) to produce a successful result (Success) when the data storage system 116 has enough available storage space to accommodate the file (F2), including any space guarantees for the file, if conversion were to proceed and (ii) to produce an unsuccessful result (Failure) when the data storage system does not have enough available storage space to accommodate the file, including any space guarantees for the file if conversion were to proceed.

At 920, in response to the storage-checking operation producing the successful result, the file (F2) is converted from the first state to the second state, e.g., thin to thick or thick to thin.

An improved technique has been described for managing storage space in a data storage system 116. The technique implements data objects in respective files and converts one or more data objects from thin to thick or from thick to thin by converting the respective files. In response to an instruction 140 to convert a set of files from thin to thick or from thick to thin, the data storage system checks whether it has enough available storage space to accommodate the set of files if conversion were to proceed. If so, conversion is performed, and each of the set of files is converted from thin to thick or from thick to thin, in accordance with the instruction.

Having described certain embodiments, numerous alternative embodiments or variations can be made. For example, embodiments have been shown and described in which files being converted from thin to thick or from thick to thin implement data objects, such as LUNs, file systems, VVols, and/or other virtual machine disks. However, this is merely an example. Alternatively, embodiments may be constructed for converting files of any kind from thin to thick or vice-versa, regardless of the content of those files.

Also, although conversion of files has been described in connection with version families, this also is merely an example, as embodiments may be constructed in which files being converted do not belong to version families.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 950 in FIG. 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A data storage system, comprising control circuitry that includes a set of processing units coupled to memory, the control circuitry constructed and arranged to:
   receive an instruction to convert a file from a first state to a second state, the first state being one of (i) a thickly-provisioned state, in which the file has a predetermined maximum size that is fully space-guaranteed, and (ii) a thinly-provisioned state, in which the file has no predetermined maximum size that is fully space-guaranteed, the second state being the other of (i) the thickly-provisioned state and (ii) the thinly-provisioned state;
   in response to receiving the instruction, perform a storage-checking operation, the storage-checking operation configured (i) to produce a successful result when the data storage system has enough available storage space to accommodate the file, including any space guarantee for the file, if conversion were to proceed and (ii) to produce an unsuccessful result when the data storage system does not have enough available storage space to accommodate the file, including any space guarantees for the file, if conversion were to proceed; and in response to the storage-checking operation producing the successful result, convert the file from the first state to the second state, wherein the storage-checking operation is configured to produce the successful result in response to the data storage system having enough available storage space to further accommodate indirect blocks for supporting mapping of the file.

2. The data storage system of claim 1, wherein the file resides in a file system of the data storage system, and wherein the control circuitry, constructed and arranged to perform the storage-checking operation, is further constructed and arranged to generate a set of family liability values for a version family in the file system, the version family including multiple files in the file system that are related to one another by snapping, the file system including other version families whose files are not related to the file by snapping.

3. A computer program product including a set of non-transitory, computer-readable media having instructions which, when executed by control circuitry of a data storage system, cause the control circuitry to perform a method for managing storage space in a data storage system, the method comprising:

receiving an instruction to convert a file from a first state to a second state, the first state being one of (i) a thickly-provisioned state, in which the file has a predetermined maximum size that is fully space-guaranteed, and (ii) a thinly-provisioned state, in which the file has no predetermined maximum size that is fully space-guaranteed, the second state being the other of (i) the thickly-provisioned state and (ii) the thinly-provisioned state;

in response to receiving the instruction, performing a storage-checking operation, the storage-checking operation configured (i) to produce a successful result when the data storage system has enough available storage space to accommodate the file, including any space guarantee for the file, if conversion were to proceed and (ii) to produce an unsuccessful result when the data storage system does not have enough available storage space to accommodate the file, including any space guarantees for the file, if conversion were to proceed; and in response to the storage-checking operation producing the successful result, converting the file from the first state to the second state, wherein the storage-checking operation produces the successful result in response to the data storage system having enough available storage space to further accommodate indirect blocks for supporting mapping of the file.

4. The computer program product of claim 3, wherein the data storage system includes a pool of storage resources, and wherein performing the storage-checking operation includes:

generating a set of liability values, the set of liability values providing an estimate of storage space that would be required if conversion of the files were to proceed;

identifying, based on the set of liability values, an amount of insurance needed from the pool to complete the conversions; and conducting an insurance-requesting operation, the insurance-requesting operation configured to (i) grant insurance when the pool has enough available storage space to guarantee the needed amount of insurance and (ii) deny insurance when the pool does not have enough available storage space to guarantee the needed amount of insurance.

5. The computer program product of claim 4, wherein the files reside within a file system, and wherein the instruction specifies conversion of the files from the thin state to the thick state.

6. The computer program product of claim 5, wherein generating the set of liability values includes generating a set of family liability values for each of a set of version families in the file system that contain any of the files, each version family including multiple files in the file system that are related to one another by snapping.

7. The computer program product of claim 6, wherein generating the set of liability values further includes generating an overhead liability value, the overhead liability value representing space requirements, if conversion of the files were to proceed, for file system metadata that is common to multiple version families, wherein generating the overhead liability value includes coalescing metadata space requirements that would arise from converting the files individually, and wherein identifying the amount of insurance needed from the pool includes converting the overhead liability value into a minimum integer number of storage extents that contain the overhead liability value, wherein a storage extent is a smallest unit of storage that may be insured from the pool.

8. The computer program product of claim 7, wherein performing the storage-checking operation further includes, after generating the set of liability values:

identifying a quantity of unused insurance already held by the file system;

reserving the quantity of unused insurance for conversion of the files from thin to thick;

requesting an additional amount of insurance from the pool, the additional amount of insurance greater than or equal to a difference between the set of liability values, in aggregate, and the quantity of unused insurance that has been reserved; and in response to confirming that the pool has enough available storage space to provide the additional amount of insurance, notifying the administrative program that the conversion of each of the files from thin to thick is complete.

9. The computer program product of claim 8, wherein converting each of the files from the thin state to the thick state includes, after notifying the administrative program that the conversion from the thin state to the thick state is complete, updating metadata of the file system to indicate that each file is a thick file.

10. The computer program product of claim 9, wherein updating the metadata of the file system includes, for each of the files, accessing an inode of the respective file and setting an attribute in that inode.

11. A method of managing storage space in a data storage system, the method comprising:
- receiving an instruction to convert a file from a first state to a second state, the first state being one of (i) a thickly-provisioned state, in which the file has a predetermined maximum size that is fully space-guaranteed, and (ii) a thinly-provisioned state, in which the file has no predetermined maximum size that is fully space-guaranteed, the second state being the other of (i) the thickly-provisioned state and (ii) the thinly-provisioned state;
- in response to receiving the instruction, performing a storage-checking operation, the storage-checking operation configured (i) to produce a successful result when the data storage system has enough available storage space to accommodate the file, including any space guarantees for the file, if conversion were to proceed and (ii) to produce an unsuccessful result when the data storage system does not have enough available storage space to accommodate the file, including any space guarantees for the file, if conversion where to proceed; and
- in response to the storage-checking operation producing the successful result, converting the file from the first state to the second state,
- wherein the storage-checking operation produces the successful result when the data storage system has enough available storage space to further accommodate indirect blocks for supporting mapping of the file.

12. The method of claim 11, wherein the data storage system includes a pool of storage resources, and wherein performing the storage-checking operation includes:
- generating a set of liability values, the set of liability values providing an estimate of storage space that would be required if the conversion were to proceed;
- identifying, based on the set of liability values, an amount of insurance needed from the pool to complete the conversion; and
- conducting an insurance-requesting operation, the insurance-requesting operation configured to (i) grant insurance when the pool has enough available storage space to guarantee the needed amount of insurance and (ii) deny insurance when the pool does not have enough available storage space to guarantee the needed amount of insurance.

13. The method of claim 12,
wherein the instruction to convert the file is received from an administrative program operated by a user, and
wherein the instruction specifies conversion of the file from the thin state to the thick state.

14. The method of claim 13, wherein the file resides in a file system of the data storage system, and wherein converting the file from the thin state to the thick state includes updating metadata of the file system to indicate that the file is a thick file.

15. The method of claim 14, wherein generating the set of liability values includes generating a set of family liability values for a version family in the file system that contains the file, the version family including multiple files in the file system that are related to one another by snapping, the file system including other version families whose files are not related to the file by snapping.

16. The method of claim 15, wherein generating the set of family liability values includes (i) generating a family data liability value that represents space requirements, if conversion were to proceed, for data of the file and (ii) generating a family metadata value that represents space requirements, if conversion were to proceed, for indirect blocks supporting the file.

17. The method of claim 16, wherein generating the set of liability values further includes generating an overhead liability value, the overhead liability value representing space requirements, if conversion were to proceed, for file system metadata that is common to multiple version families in the file system.

18. The method of claim 17, wherein performing the storage-checking operation further includes, after generating the set of liability values:
- identifying a quantity of unused insurance already held by the file system;
- reserving the quantity of unused insurance for conversion of the file from thin to thick;
- requesting an additional amount of insurance from the pool, the additional amount of insurance greater than or equal to a difference between the set of liability values, in aggregate, and the quantity of unused insurance that has been reserved; and
- in response to confirming that the pool has enough available storage space to provide the additional amount of insurance, notifying the administrative program that the conversion from thin to thick is complete.

19. The method of claim 18, wherein updating the metadata of the file system to indicate that the file is a thick file is performed after notifying the administrative program that the conversion from the thin state to the thick state is complete.

20. The method of claim 19, wherein updating the metadata of the file system to indicate that the file is a thick file includes accessing an inode of the file and setting an attribute in the inode.

* * * * *